United States Patent
Lee et al.

(10) Patent No.: US 12,275,806 B2
(45) Date of Patent: Apr. 15, 2025

(54) METHOD FOR PREPARING MODIFICATION INITIATOR AND APPARATUS FOR PREPARING THE SAME

(71) Applicant: LG Chem, Ltd., Seoul (KR)

(72) Inventors: Tae Chul Lee, Daejeon (KR); He Seung Lee, Daejeon (KR); No Ma Kim, Daejeon (KR); Heung Yeal Choi, Daejeon (KR); Youk Reol Na, Daejeon (KR)

(73) Assignee: LG Chem, Ltd., Seoul (KR)

( * ) Notice: Subject to any disclaimer, the term of this patent is extended or adjusted under 35 U.S.C. 154(b) by 699 days.

(21) Appl. No.: 17/441,433

(22) PCT Filed: Oct. 12, 2020

(86) PCT No.: PCT/KR2020/013877
§ 371 (c)(1),
(2) Date: Sep. 21, 2021

(87) PCT Pub. No.: WO2021/071341
PCT Pub. Date: Apr. 15, 2021

(65) Prior Publication Data
US 2022/0213239 A1  Jul. 7, 2022

(30) Foreign Application Priority Data

Oct. 11, 2019 (KR) .................. 10-2019-0126517

(51) Int. Cl.
| | |
|---|---|
| *C08F 136/06* | (2006.01) |
| *B01J 19/00* | (2006.01) |
| *C08F 2/00* | (2006.01) |
| *C08F 2/01* | (2006.01) |
| *C08F 8/04* | (2006.01) |
| *C08F 236/10* | (2006.01) |

(52) U.S. Cl.
CPC ......... *C08F 136/06* (2013.01); *B01J 19/0053* (2013.01); *C08F 2/001* (2013.01); *C08F 2/01* (2013.01); *C08F 8/04* (2013.01); *C08F 236/10* (2013.01)

(58) Field of Classification Search
None
See application file for complete search history.

(56) References Cited

U.S. PATENT DOCUMENTS

| | | | |
|---|---|---|---|
| 4,397,994 A | | 8/1983 | Takeuchi et al. |
| 5,491,230 A | * | 2/1996 | Lawson .................. C07F 1/02 |
| | | | 546/184 |
| 2008/0033110 A1 | | 2/2008 | Suzuki et al. |
| 2018/0208684 A1 | | 7/2018 | Choe et al. |
| 2019/0077891 A1 | | 3/2019 | Nakatani et al. |
| 2019/0083949 A1 | | 3/2019 | Lee et al. |
| 2019/0330447 A1 | | 10/2019 | Choe et al. |
| 2020/0079797 A1 | | 3/2020 | Lee et al. |
| 2020/0299419 A1 | | 9/2020 | Choe et al. |

FOREIGN PATENT DOCUMENTS

| | | |
|---|---|---|
| CN | 108778482 A | 11/2018 |
| CN | 110072868 A | 7/2019 |
| EP | 3351566 A1 | 7/2018 |
| JP | H106271706 A | 9/1994 |
| JP | 2011219699 A | 11/2011 |
| JP | 2019515125 A | 6/2019 |
| KR | 20160079323 A | 7/2016 |
| KR | 20160092227 A | 8/2016 |
| KR | 20180028769 A | 3/2018 |
| KR | 20180073319 A | 7/2018 |
| KR | 20180080687 A | 7/2018 |
| KR | 101910146 B1 | 10/2018 |
| KR | 20180108305 A | 10/2018 |
| KR | 20180118764 A | 10/2018 |
| WO | 2005097845 A1 | 10/2005 |
| WO | 2019177436 A1 | 9/2019 |

OTHER PUBLICATIONS

International Search Report for PCT /KR2020/013877 dated Jan. 15, 2021. 2 pgs.
Database WPI, Week 201663, Thomson Scientific, London, GB; AN 2016-48850G, XP002806518.
Extended European Search Report including Written Opinion for Application No. 20875312.9 dated May 31, 2022, pp. 1-5.

* cited by examiner

*Primary Examiner* — Fred M Teskin
(74) *Attorney, Agent, or Firm* — Lerner David LLP

(57) ABSTRACT

The present invention relates to a method for preparing a modification initiator, the method capable of reducing side reactions to the minimum and obtaining the modification initiator with a high conversion rate, and an apparatus for performing the same, wherein the method includes (S1) reacting a first fluid including a modification functional group-containing compound and a conjugated diene-based monomer and a second fluid including a polymerization initiation functional group-containing compound, and (S2) obtaining a third fluid including a modification initiator prepared by the reaction of Step S1, wherein the modification functional group-containing compound is used in a ratio of greater than 1 mole based on 1 mole of the polymerization initiation functional group-containing compound, the conjugated diene-based monomer is used in a ratio of 1 mole to 4 moles based on 1 mole of the modification functional group-containing compound, and Step S1 and Step S2 are continuously performed.

11 Claims, No Drawings

METHOD FOR PREPARING MODIFICATION INITIATOR AND APPARATUS FOR PREPARING THE SAME

CROSS-REFERENCE TO RELATED APPLICATIONS

The present application is a national phase entry under 35 U.S.C. § 371 of International Application No. PCT/KR2020/013877 filed Oct. 12, 2020, which claims priority from Korean Patent Application No. 10-2019-0126517, filed Oct. 11, 2019, all of which are incorporated herein by reference.

TECHNICAL FIELD

The present invention relates to a method for preparing a modification initiator, the method capable of reducing side reactions to the minimum and obtaining the modification initiator with a high conversion rate, and a modification initiator production apparatus for performing the same.

BACKGROUND ART

With the recent demand for low fuel consumption of automobiles, there has been a demand for a conjugated diene-based polymer as a rubber material for a tire, wherein the polymer has low rolling resistance, excellent abrasion resistance and tensile properties as well as control stability represented by wet road surface resistance.

In order to reduce rolling resistance of a tire, there is a way to reduce the hysteresis loss of vulcanized rubber, and as an evaluation index of such vulcanized rubber, repulsive elasticity of 50° C. to 80° C., tan δ, Goodrich heat generation, and the like are used. That is, a rubber material having large repulsive elasticity at the above temperatures, or having a small tan δ or Goodrich heat generation is preferred.

As a rubber material having small hysteresis loss, natural rubber, polyisoprene rubber, polybutadiene rubber, or the like are known, but these have a problem of having low wet road surface resistance. Therefore, in recent years, a conjugated diene-based polymer or a copolymer such as styrene-butadiene rubber (hereinafter, referred to as SBR) or butadiene rubber (hereinafter, referred to as BR) has been produced by emulsion polymerization or solution polymerization and used as rubber for a tire. Of the above, the greatest advantage of solution polymerization over emulsion polymerization is that a vinyl structure content and a styrene content which define the physical properties of rubber may be arbitrarily adjusted, and a molecular weight, physical properties, and the like of the rubber may be adjusted by coupling or modification. Therefore, it is easy to change the structure of a finally produced SBR or BR, and it is possible to decrease the movement of a chain end by coupling or modification of the chain end and to increase the coupling force with a filler such as silica or carbon black, so that SBR by solution polymerization is widely used as a rubber material for a tire.

When such a solution polymerization SBR is used as a rubber material for a tire, the content of vinyl in the SBR may be increased, thereby increasing the glass transition temperature of the rubber to adjust required physical properties of a tire such as driving resistance and braking force, and also, the glass transition temperature may be appropriately adjusted to reduce fuel consumption. The solution polymerization SBR is produced using an anionic polymerization initiator, and is used by coupling or modifying chain ends of a formed polymer using various modifiers. For example, U.S. Pat. No. 4,397,994 discloses a technique of coupling an active anion using a coupling agent such as a tin compound, the anion at a chain end of a polymer obtained by polymerizing styrene-butadiene using alkyllithium, which is a monofunctional initiator, in the presence of a non-polar solvent.

Meanwhile, carbon black and silica are used as reinforcing fillers for tire treads. When silica is used as a reinforcing filler, there are advantages in that low hysteresis loss properties and wet road surface resistance are improved. However, compared to carbon black of a hydrophobic surface, silica of a hydrophilic surface has a disadvantage of having low affinity with rubber, thereby having poor dispersibility, so that it is necessary to use a separate silane coupling agent in order to improve dispersibility or to impart coupling between silica and rubber. Therefore, there is a method in which a functional group having affinity or reactivity with silica is introduced at an end portion of a rubber molecule, but the effect of the method is not sufficient.

In addition, as the method of introducing a functional group, a method has been proposed in which polymerization is initiated through a modification initiator and a functional group derived from the modification initiator is introduced at one end of a polymer. Such a modification initiator is produced by reacting a modification group-containing material and a polymerization initiation material, and when the reaction is performed, it is possible to adjust the ratio of the modification group-containing material and the polymerization initiation material, thereby adjusting the ratio of a unit derived from the modification group-containing material in a modification initiator to be produced. At this time, when the ratio of a unit derived from the modification group-containing material is high in the modification initiator, that is, when the modification group-containing material has been used in excess compared to the polymerization initiation material, the effect of introducing a functional group into a polymer may be greater.

However, when the modification group-containing material is used in excess compared to the polymerization initiation material, undesired oligomers may be excessively generated during the reaction due to an anionic polymerization reaction among reactants. Thus, there is a problem in that a reactor pipe is clogged, which stops the reaction, thereby degrading the production efficiency of a modification initiator, and there is a problem in that the reactants are not uniformly mixed, thereby degrading the conversion rate of the modification initiator. Therefore, there is a need for developing a method capable of easily producing a modification initiator having a high modification rate without the interruption of a reaction.

PRIOR ART DOCUMENT (Patent Document 1) JP1994-271706 A

DISCLOSURE OF THE INVENTION

Technical Problem

An aspect of the present invention provides a method for preparing a modification initiator, the method which is capable of obtaining a modification initiator of a high modification rate with a high conversion rate without a problem in which oligomers are excessively generated, which inhibits a reaction, and the modification initiator is used in the preparation of a polymer and is capable of easily modifying the polymer with a high modification rate and easily initiating polymerization at the same time.

Another aspect of the present invention provides an apparatus for preparing a modification initiator, the apparatus capable of performing the method for preparing a modification initiator of the present invention.

Technical Solution

According to an embodiment of the present invention, there is provided a method for preparing a modification initiator, the method including reacting a first fluid including a modification functional group-containing compound and a conjugated diene-based monomer and a second fluid including a polymerization initiation functional group-containing compound (S1), and obtaining a third fluid including a modification initiator prepared by the reaction of step S1, wherein the modification functional group-containing compound is used in a ratio of greater than 1 mole based on 1 mole of the polymerization initiation functional group-containing compound, the conjugated diene-based monomer is used in a ratio of 1 mole to 4 moles based on 1 mole of the modification functional group-containing compound, and the step S1 and step S2 are continuously performed.

According to another aspect of the present invention, there is provided an apparatus for preparing a modification initiator, the apparatus for performing the above method for preparing a modification initiator, wherein the apparatus is a reactor provided with a first fluid inlet, a second fluid inlet, a mixing part in which a first fluid and a second fluid are mixed, and an outlet through which a third fluid is discharged.

Advantageous Effects

A method for preparing a modification initiator according to the present invention is performed by a continuous reaction, so that the ratio of a first fluid and a second fluid may be maintained constant during the reaction, and thus, side reactions such as remaining non-reactants and remaining unmodified initiators may be minimized, thereby producing a modification initiator with a high conversion rate.

In addition, the method for preparing a modification initiator performs a reaction while maintaining an excess ratio of a modification functional group-containing compound to a polymerization initiation functional group-containing compounds for further improving a modification rate when producing a modification initiator. At this time, the modification functional group-containing compound is preliminarily mixed with a conjugated diene-based monomer and then is allowed to participate in the reaction, so that solvent solubility may be excellent, and the generation of excessive oligomers and clogging of a reactor due to the oligomers may be suppressed, so that a modification initiator having a high modification rate may be easily prepared without the degradation in conversion rate.

BEST MODE FOR CARRYING OUT THE INVENTION

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the present invention, the term 'modification initiator' may mean a polymerization initiator for initiating a polymerization reaction, and may mean that the polymerization initiator includes a modification functional group of a polymer. The modification initiator may be, for example, a modification initiator for initiating the polymerization of a conjugated diene-based polymer, and in this case, the modification initiator may have high activity and ensure sufficient randomization of monomers.

In the present invention, the term 'functional group-containing compound' may mean a compound in which a functional group, which is an atomic group exhibiting specific properties, is substituted in a molecule of the compound.

In the present invention, the term 'monovalent hydrocarbon group' may mean a monovalent atomic group in which carbon and hydrogen are coupled, such as a monovalent alkyl group, an alkenyl group, an alkynyl group, a cycloalkyl group, or an aryl group containing one or more unsaturated bonds.

The present invention provides a method for preparing a modification initiator, the method which is capable of obtaining a modification initiator of a high modification rate with a high conversion rate without a problem in which oligomers are excessively generated, which inhibits a reaction, and the modification initiator is capable of easily modifying a polymer with a high modification rate and easily initiating polymerization at the same time.

The method for preparing a modification initiator according to the present invention includes reacting a first fluid including a modification functional group-containing compound and a conjugated diene-based monomer and a second fluid including a polymerization initiation functional group-containing compound (S1), and obtaining a third fluid including a modification initiator prepared by the reaction of step S1, wherein the modification functional group-containing compound is used in a ratio of greater than 1 mole based on 1 mole of the polymerization initiation functional group-containing compound, the conjugated diene-based monomer is used in a ratio of 1 mole to 4 moles based on 1 mole of the modification functional group-containing compound, and step S1 and step S2 are continuously performed.

When a modification initiator is prepared according to the above method for preparing a modification initiator, the method is performed by a continuous reaction, so that the first fluid and the second fluid may be maintained constant at desired ratios during the reaction, and thus, side reactions such as remaining non-reactants and remaining unmodified initiators may be minimized, thereby producing a modification initiator with a high conversion rate.

In addition, in general, when a modification functional group-containing compound is reacted in an excess ratio to a polymerization initiation functional group-containing compound, the modification functional group-containing compound is coupled to the polymerization initiation functional group-containing compound in the form of an oligomer, so that a modification initiator of high modification having a high ratio of a modification functional group may be formed. However, when there is a large amount of a modification functional group-containing compound in a reactant, polarity increases so that the solubility for a solvent decreases, and oligomers are excessively generated, so that there may be problems in which a reactor is clogged and the like, which prevent the reaction from continuing. However, the method for preparing a modification initiator according to the present invention preliminarily mixes a modification functional group-containing compound with a conjugated diene-based monomer and then allows the mixture to react with a polymerization initiation functional group-containing compound, so that solvent solubility is improved to allow a reaction to be performed continuously. Also, the generation of excessive oligomers and clogging of a reactor due to the oligomers may be suppressed, so that a modification initiator of a high modification rate having a high ratio of a modification functional group and excellent solvent solubility may be produced.

The modification functional group-containing compound is a compound for introducing a modification functional group at one end of a polymer polymerized by initiating polymerization through a modification initiator, and may be selected according to a modification purpose of the polymer, and for example, may be a compound containing a hydrocarbon group for improving solvent affinity, a compound containing hetero atoms for improving affinity with a filler, and the like. In addition, the modification functional group-containing compound is a compound which is anionized through a reaction with the polymerization initiation functional group-containing compound to produce a modification initiator, and may be a compound containing an unsaturated bond to which the polymerization initiation functional group-containing compound is easily added, or may be a compound containing hydrogen atoms which are easily removed from the polymerization initiation functional group-containing compound.

As a specific example, the modification functional group-containing compound may be a compound represented by Formula 1 below.

[Formula 1]

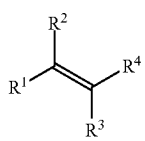

In Formula 1 above, $R^1$ to $R^4$ may each independently be a C1-C30 monovalent hydrocarbon group, a C1-C30 heteroalkyl group containing one or more hetero atoms selected from the group consisting of N, O, and S, or a C4-C30 heterocyclic group containing one or more hetero atoms selected from the group consisting of N, O, and S.

As a more specific example, the compound represented by Formula 1 above may be an aromatic vinyl compound such as styrene, α-methyl styrene, and p-methyl styrene; an aromatic vinyl compound derivative in which a monovalent hydrocarbon group, a heteroalkyl group containing one or more hetero atoms selected from the group consisting of N, O, and S, or a heterocyclic group is substituted on one more carbons constituting the aromatic vinyl compound; a conjugated diene-based compound such as 1,3-butadiene and isoprene; or a conjugated diene-based compound derivative in which a monovalent hydrocarbon group, a heteroalkyl group containing one or more hetero atoms selected from the group consisting of N, O, and S, or a heterocyclic group is substituted on any one or more carbons constituting the conjugated diene-based compound.

As another example, the modification functional group-containing compound may be a compound represented by Formula 2 below.

[Formula 2]

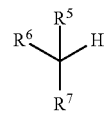

In Formula 2 above, $R^5$ to $R^7$ may each independently be a C1-C30 monovalent hydrocarbon group, a C1-C30 heteroalkyl group containing one or more hetero atoms selected from the group consisting of N, O, and S, or a C4-C30 heterocyclic group containing one or more hetero atoms selected from the group consisting of N, O, and S, or $R^5$ and $R^6$, $R^6$ and $R^7$, or $R^5$ and $R^7$ may be bonded to each other to form a C5-C30 hydrocarbon ring group. When $R^5$ and $R^6$, $R^6$ and $R^7$, or $R^5$ and $R^7$ are bonded to each other to form a C5-C30 hydrocarbon ring group, the hydrocarbon ring group may include $—CR^8R^9—$, $—NR^{10}—$, $—O—$, or $—S—$ in the ring, and $R^8$, $R^9$, and $R^{10}$ may each independently be hydrogen, a C1-C30 monovalent hydrocarbon group, a C1-C30 heteroalkyl group containing one or more hetero atoms selected from the group consisting of N, O, and S, or a C4-C30 heterocyclic group containing one or more hetero atoms selected from the group consisting of N, O, and S.

In addition, the conjugated diene-based monomer may be mixed with a modification functional group-containing compound to suppress the decrease in solvent solubility in accordance with an increase in the ratio of the modification functional group-containing compound in a reactant, thereby facilitating the reaction, or may suppress the generation of excessive oligomers and clogging of a reactor in accordance with the increase in the ratio of the modification functional group-containing compound, thereby facilitating the production of a modification initiator of high modification. As a result, when a modification initiator prepared therefrom is used in the preparation of a polymer, a polymerization reaction may be facilitated and the polymer may be highly modified at the same time.

In the present invention, the conjugated diene-based monomer may be included in the first fluid in a ratio of 1 mole to 4 moles, specifically 1 mole to 2 moles based on 1 mole of a modification functional group-containing compound. When in the above range, a reaction having a high conversion rate may be induced without the presence of an unreacted modification functional group-containing compound without causing side reactions by an unreacted conjugated diene-based monomer.

Although not particularly limited, the conjugated diene-based monomer may be, for example, one or more selected from the group consisting of 1,3-butadiene, 2,3-dimethyl-1,3-butadiene, piperylene, 3-butyl-1,3-octadiene, isoprene, and 2-phenyl-1,3-butadiene.

In addition, the polymerization initiation functional group-containing compound may be a compound which reacts with the modification functional group-containing compound to produce a modification initiator, and may be, for example, an anionic compound. As a specific example, the polymerization initiation functional group-containing compound may be a compound in which an organic group representing an anion and a metal representing a cation are coupled by ionic coupling.

As a more specific example, the polymerization initiation functional group-containing compound may be a compound represented by Formula 3 below.

$$R^{11}-M \quad \text{[Formula 3]}$$

In Formula 3 above, $R^{11}$ may be a C1-C30 monovalent hydrocarbon group, and M may be a metal, specifically an alkali metal.

As a more specific example, the compound represented by Formula 3 above may be an anionic compound in which a proton of any one or more carbons constituting a C1-C30 alkyl group or a C4-C30 cycloalkyl group is substituted with the M. That is, the M may be coupled with a neighboring carbon by ionic coupling.

According to an embodiment of the present invention, the first fluid including a modification functional group-containing compound and a conjugated diene-based monomer of step S1 above may be a mixture in which a modification functional group-containing compound and a conjugated diene-based monomer are directly mixed, or may be a solution in which the modification functional group-containing compound and the conjugated diene-based monomer are dissolved in a solvent.

In addition, according to an embodiment of the present invention, the second fluid including a polymerization initiation functional group-containing compound of step S1 above may be the polymerization initiation functional group-containing compound itself, or may be a solution in which the polymerization initiation functional group-containing compound is dissolved in a solvent.

When each of the first fluid and the second fluid is a solution, a solvent may be a solvent capable of dissolving a modification functional group-containing compound, a polymerization initiation functional group-containing compound, and a conjugated diene-based monomer, and may be, for example, a hydrocarbon solvent such as hexane, cyclohexane, methylcyclohexane, toluene, and ethylbenzene.

According to an embodiment of the present invention, at least one of the first fluid and the second fluid may further include a polar additive, and the polar additive may be included in a molar ratio (modification functional group-containing compound or polymerization initiation functional group-containing compound:polar additive) of 10:1 to 1:10, 5:1 to 1:5, 3:1 to 1:3, or 2:1 to 1:2 to the modification functional group-containing compound and the polymerization initiation functional group-containing compound, respectively, depending on the polar additive is to be included in which fluid of the first fluid and the second fluid. When in the above range, the difference in reaction rate between the modification functional group-containing compound and the polymerization initiation functional group-containing compound is compensated, so that there is an effect of reducing side reactions to the minimum. The polar additive may be, for example, one or more selected from the group consisting of tetrahydrofuran, 2,2-di(2-tetrahydrofuryl)propane, diethyl ether, cyclopentyl ether, dipropyl ether, ethylene methyl ether, ethylene dimethyl ether, diethyl glycol, dimethyl ether, tertiary butoxyethoxyethane, bis(2-dimethylaminoethyl)ether, (dimethylaminoethyl)ethyl ether, trimethylamine, triethylamine, tripropylamine, and tetramethylethylenediamine.

As another example, in the production method according to an embodiment of the present invention, the first fluid may further include a polar additive. In this case, the first fluid may include a modification functional group-containing compound, a conjugated diene-based monomer, and the polar additive. At this time, the first fluid may be prepared by sequentially and continuously mixing the modification functional group-containing compound, the conjugated diene-based monomer, and the polar additive.

As yet another example, in step S1, a modification functional group-containing compound may be used in a ratio exceeding 1 mole based on 1 mole of a polymerization initiation functional group-containing compound, that is, may be used in excess compared to the polymerization initiation functional group-containing compound. Specifically, the modification functional group-containing compound may be used in a ratio of 1.5 moles to 10.0 moles, 1.5 moles to 5 moles, or 3.0 moles to 5.0 moles based on 1 mole of the polymerization initiation functional group-containing compound. In this case, two or more modification functional group-containing compounds may be coupled, and thus, a multimeric oligomer of dimer, trimer, tetramer or more may be generated, and when a modification initiator of a high modification rate produced therefrom is applied in preparing a polymer, the polymer may be modified with a high modification rate, so that the physical properties of the polymer may be improved. Therefore, the method for producing a modification initiator according to the present invention may be performed to allow a product to be obtained by reacting a modification functional group-containing compound and a polymerization initiation functional group-containing compound in an appropriate molar ratio in accordance with conditions of a polymer to be produced from the modification initiator.

In addition, according to an embodiment of the present invention, the temperature inside the reactor may be −50° C. to 50° C., −40° C. to 40° C., or −30° C. to 40° C., preferably 10° C. to 40° C. When in the above range, a reaction rate is excellent, and there is an effect of reducing side reactions to the minimum.

According to an embodiment of the present invention, the step S1 and step S2 may be continuously performed. When the step S1 and step S2 are continuously performed, a modification initiator may be continuously produced, so that there is an effect in that productivity is excellent. Furthermore, when producing a modification initiator, there is no modification initiator remaining in a reactor after a reaction is completed, so that a modification functional group-containing compound and a polymerization initiation functional group-containing compound which are continuously introduced are smoothly reacted, so that there is an effect in that the modification initiator has an excellent conversion rate.

Meanwhile, the step S1 is performed by adding, into a reactor provided with a first fluid inlet and a second fluid inlet, the first fluid through the first fluid inlet and the second fluid through the second fluid inlet, and then mixing the first fluid and the second fluid, wherein at the time of the mixing, the flow rate of the first fluid and the second fluid may be maintained constant, and the flow velocity of the first fluid may be increased.

Specifically, the step S1 may be a step in which the first fluid and the second fluid are introduced into their own inlet and are mixed with each other in the reactor, and as a result of the mixing, the modification functional group-containing compound and the conjugated diene-based monomer included in the first fluid and the polymerization initiation functional group-containing compound included in the second fluid are reacted to produce a modification initiator.

According to an embodiment of the present invention, in step S1, the flow rate of the first fluid and the flow rate of the second fluid at the time of the mixing of the first fluid and the second fluid may be maintained constant. The flow rate may be a flow rate at the time of introducing into each fluid inlet, and may be controlled by adjusting the flow rate at the time of introducing each fluid into each fluid inlet in consideration of reactivity, reaction rate, reaction environment, and the like.

In addition, according to an embodiment of the present invention, in step S1, the flow velocity of the first fluid at the time of the mixing of the respective fluids may be increased. The flow velocity of the first fluid may be increased as the first fluid flows through a deformation part provided in the reactor. The deformation part through which the first fluid flows is to instantaneously increase the flow velocity of the first fluid when the first fluid and the second fluid are mixed, and the inner diameter, outer diameter, or cross-sectional area of the reactor through which the first fluid flows before the mixing may be reduced within a predetermined range, or may be gradually decreased. As described above, when the instantaneous flow velocity of the first fluid is increased as the first fluid flows through the deformation part in the reactor, there is an effect of improving the mixing force of each fluid without having a separate stirrer or a mixer. Meanwhile, the flow velocity of the first fluid may be temporarily increased only when the first fluid passes through the deformation part, and then each fluid is mixed.

According to an embodiment of the present invention, when each fluid is added in step S1, the flow of each of the first fluid and the second fluid may be a laminar flow. In the present invention, the term 'laminar flow' means a dimensionless integer representing the flow state of a fluid having a Reynolds number ($N_{Re}$) of 2,100 or less.

The Reynolds number is a ratio of the kinetic force of a fluid and the viscous force thereof, and may be calculated by Equation 1 below.

$$\text{Reynolds number } (N_{Re}) = \rho v d / \mu \qquad \text{[Equation 1]}$$

In the Equation 1 above, $\rho$ is the density of a fluid, V is the flow velocity of the fluid in an inlet and in a reactor, d is then inner diameter of the inlet and of the reactor, and $\mu$ is the viscosity of the fluid.

Typically, when the velocity of a fluid decreases, the kinetic force thereof decreases, so that the Reynolds number of the fluid is reduced. When the viscosity of a fluid increases, the viscous force thereof increases, so that the Reynolds number of the fluid is reduced. At this time, a fluid having relatively small kinetic force flows relatively smoothly, and the flow of the fluid continues to face resistance at the inner wall of an inlet, a deformation part, an outlet, and the like, so that the velocity of the fluid decreases, and at the center of the inlet, the deformation part, the outlet, and the like, the velocity of the fluid reaches the highest point, so that a parabolic velocity distribution with a large flow appears going from the inner wall to the center. The laminar flow may mean a flow form having the above velocity distribution.

As a specific example, when the first fluid is added in step S1, the Reynolds number ($N_{Re}$) of the first fluid may be 2,100 or less, 1 to 2,100, 10 to 1,500, or 30 to 1,000, preferably 50 to 500. When in the above range, a laminar flow is maintained, and at the same time, since the flow rate of the first fluid is appropriately maintained, there is an effect of reducing side reactions to the minimum.

As another example, when the second fluid is added in step S1, the Reynolds number ($N_{Re}$) of the second fluid may be 2,100 or less, 1 to 2,100, 10 to 1,500, or 30 to 1,000, preferably 50 to 500. When in the above range, a laminar flow is maintained, and at the same time, since the flow rate of the second fluid is appropriately maintained, there is an effect of reducing side reactions to the minimum.

Meanwhile, the first fluid according to the present invention is introduced into the reactor through the first fluid inlet, flows through the deformation part, and then is mixed with the second fluid. The Reynolds number of the first fluid may be maintained constant from the time when the first fluid is introduced through the first fluid inlet and flows to the deformation part, and the Reynolds number of the first fluid may gradually decrease at the time of passing through the deformation part and then mixing with the second fluid. This may be due to the decrease in the inner diameter, outer diameter, or cross-sectional area of the deformation part having a shape in which the inner diameter, outer diameter, or cross-sectional area of the reactor is reduced within a predetermined range, although the flow velocity of the first fluid increases due to the deformation part at the time of mixing each fluid.

In addition, the second fluid according to the present invention is introduced into the reactor through the second fluid inlet and then is mixed with the first fluid. The Reynolds number of the second fluid may be maintained constant from the time when the second fluid is introduced through the second fluid inlet and flows until each fluid is mixed.

According to an embodiment of the present invention, when adding the first fluid and the second fluid in step S1, the flow direction of each of the first fluid and the second fluid may be perpendicular to each other. The flow direction of each of the first fluid and the second fluid may be adjusted from the installation position of each of the first fluid inlet and the second fluid inlet, and may be adjusted by providing each of the first fluid inlet and the second fluid inlet in a direction perpendicular to each other in the reactor. When the flow direction of each of the first fluid and the second fluid are perpendicular to each other thereby, there is an effect of facilitating uniform mixing at the time of mixing the first fluid and the second fluid while maintaining a laminar flow. As another example, at the time of adding the first fluid and the second fluid, the flow direction of each of the first fluid and the second fluid may be perpendicular to each other, but when the first fluid is added into the reactor and flows through the deformation part, the flow direction of each of the first fluid and the second fluid may be parallel to each other. In this case, the contact area of the first fluid and the second fluid at the time when the first fluid and the second fluid are mixed is large, so that there is an excellent effect of uniform mixing.

Meanwhile, the flow of a third fluid obtained in step S2 through step S1 may be a laminar flow.

As a specific example, the Reynolds number ($N_{Re}$) of the third fluid obtained in step S2 may be 2,100 or less, 1 to 2,100, 10 to 1,500, or 30 to 1,000, preferably 50 to 500. When in the above range, a laminar flow is maintained, and at the same time, since the flow rate of the third fluid is appropriately maintained, there is an effect of reducing side reactions to the minimum.

An apparatus for producing a modification initiator according to the present invention is to perform the above method for preparing a modification initiator, wherein the apparatus may be a reactor provided with a first fluid inlet, a second fluid inlet, a deformation part for increasing the flow velocity of a first fluid, a mixing part in which the first fluid and a second fluid are mixed, and an outlet through which a third fluid is discharged.

The reactor may be, for example, a tubular reactor. The inner diameter, outer diameter, or cross-sectional area of the first fluid inlet, the second fluid inlet, and the outlet provided in the reactor may each independently be 0.01 to 0.99 times, 0.05 to 0.95 times, 0.1 to 0.9 times, or 0.3 to 0.7 times the inner diameter, outer diameter, or cross-sectional area of the reactor. When in the above range, there is an excellent effect of increasing the flow velocity of the first fluid.

The first fluid inlet and the second fluid inlet may each be, for example, provided at an end portion or side portion of the reactor, or may each be provided in the form of being inserted inside the reactor.

The outlet may be connected to a polymerization reactor for initiating polymerization from a modification initiator, and the polymerization reactor may be a continuous reactor.

The deformation part is to instantaneously increase the flow velocity of the first fluid when each fluid is mixed, and the inner diameter, outer diameter, or cross-sectional area of the reactor through which the first fluid flows before the mixing of each fluid may be reduced within a predetermined range, or may be gradually decreased in a direction from the inlet of the first fluid to the outlet. As another example, the shape in which the inner diameter, outer diameter, or cross-sectional area of the deformable part is reduced or is gradually decreased may be a shape in which the inner diameter, outer diameter, or cross-sectional area of the reactor gradually decreases to the inner diameter, outer diameter or cross-sectional area of the outlet. According to an embodiment of the present invention, the time point at which each fluid is mixed in the mixing part may be a point of time when the first fluid passes through an end portion of the deformation part.

The mixing part may be separately provided in the reactor, or may mean a position at which the first fluid which has passed through the deformation part and the second fluid which has passes through the second fluid inlet are mixed in the reactor.

Hereinafter, the present invention will be described in detail with reference to examples. However, the following examples are merely illustrative of the present invention and are not intended to limit the scope of the present invention.

EXAMPLES

Example 1

A tubular reactor provided with a first fluid inlet, a second fluid inlet, a deformation part, and an outlet was prepared. The outer diameter of the tubular reactor body is ¼ inch, and the first fluid inlet is provided on a side portion of the tubular reactor and has an outer diameter of ⅛ inch. The second fluid inlet is provided in the form of being inserted inside from one end of the tubular reactor to a connection part of the deformation part and the outlet while being spaced apart from the connection part of the deformation part and the outlet and has an outer diameter of ⅛ inch. The outlet is provided at the other end of the tubular reactor and has an outer diameter of ⅛ inch. The deformation part is spaced apart from a point at which the first fluid inlet of the reactor is provided, and is connected to the outlet in the form in which the outer diameter thereof gradually decreases from the outer diameter of the tubular reactor to the outer diameter of the outlet.

Through the second fluid inlet, a solution in which a polymerization initiation functional group-containing compound n-butyllithium is dissolved in n-hexane to 1.5 wt % was added at 350 g/hr, and the Reynolds number was about 53. At the same time, through the first fluid inlet, a solution in which a modification functional group-containing compound dimethylvinylbenzylamine (DMVBA) was dissolved to 5.7 wt %, a polar additive tetramethylethylenediamine (TMEDA) was dissolved to 3.1 wt %, and 1,3-butadiene was dissolved to 3.8 wt % all together in n-hexane was added at 350 g/hr, and the Reynolds number was about 230. At this time, the molar ratio of the n-butyllithium to the dimethylvinylbenzylamine was 1:1.5, and the molar ratio of the dimethylvinylbenzylamine to the tetramethylethylenediamine was 1:0.77. The molar ratio of the dimethylvinylbenzylamine to the 1,3-butadiene was 1:2.

The n-butyllithium solution added through the second fluid inlet was moved at a flow velocity of 18 mm/sec and mixed with a solution of the dimethylvinylbenzylamine, 1,3-butadiene, and tetramethylethylenediamine, which the solution of dimethylvinylbenzylamine, 1,3-butadiene, and tetramethylethylenediamine passed through the deformation part of the reactor and the flow velocity increased to 90 mm/sec, passed through the first fluid inlet and moved to the starting point of the outlet. Subsequently, a mixed solution in which the n-butyllithium solution and the dimethylvinylbenzylamine, 1,3-butadiene, and tetramethylethylenediamine solution were mixed was introduced into the outlet at the time of the mixing, and during the retention time of about 1 minute, the mixed solution was reacted at 20° C. while passing through a tube provided at the outlet and having an outer diameter of ¼ inch and a length of 1.1 m. A modification initiator produced thereby was continuously obtained from the tube provided at the outlet, and at this time, the Reynolds number of the outlet and the tube provided at the outlet was about 180.

A modification initiator compound obtained thereby was hydrogenated using an excessive amount of ethanol, and when confirmed with gas chromatography, the dimethylvinylbenzylamine, which was added as a modification functional group-containing compound, was not detected, and it was confirmed that the modification initiator compound was produced at a conversion rate of 99 mol % or higher.

Example 2

Example 2 was performed in the same manner as Example 1 except that through the first fluid inlet, a solution in which dimethylvinylbenzylamine was dissolved to 11.3 wt %, a polar additive tetramethylethylenediamine was dissolved to 3.2 wt %, and 1,3-butadiene was dissolved to 6.3 wt % all together in n-hexane was added at 350 g/hr. At this time, the molar ratio of the n-butyllithium to the dimethylvinylbenzylamine was 1:3, and the molar ratio of the dimethylvinylbenzylamine to the 1,3-butadiene was 1:1.67. The reaction was performed at 40° C.

A modification initiator compound obtained thereby was hydrogenated using an excessive amount of ethanol, and when confirmed with gas chromatography, the dimethylvinylbenzylamine, which was added as a modification functional group-containing compound, was not detected, and it was confirmed that the modification initiator compound was produced at a conversion rate of 99 mol % or higher.

Example 3

Example 3 was performed in the same manner as Example 1 except that through the first fluid inlet, a solution in which dimethylvinylbenzylamine was dissolved to 18.9 wt %, a polar additive tetramethylethylenediamine was dissolved to 3.1 wt %, and 1,3-butadiene was dissolved to 10.1 wt % all together in n-hexane was added at 350 g/hr. At this time, the molar ratio of the n-butyllithium to the dimethylvinylbenzylamine was 1:5, and the molar ratio of the dimethylvinylbenzylamine to the 1,3-butadiene was 1:1.6. The reaction was performed at 40° C.

A modification initiator compound obtained thereby was hydrogenated using an excessive amount of ethanol, and when confirmed with gas chromatography, the dimethylvinylbenzylamine, which was added as a modification functional group-containing compound, was not detected, and it was confirmed that the modification initiator compound was produced at a conversion rate of 99 mol % or higher.

Example 4

Example 4 was performed in the same manner as Example 1 except that through the first fluid inlet, a solution in which dimethylvinylbenzylamine was dissolved to 11.3 wt %, a polar additive tetramethylethylenediamine was dissolved to 3.2 wt %, and 1,3-butadiene was dissolved to 15.2 wt % all together in n-hexane was added at 350 g/hr. At this time, the molar ratio of the n-butyllithium to the dimethylvinylbenzylamine was 1:3, and the molar ratio of the dimethylvinylbenzylamine to the 1,3-butadiene was 1:4. The reaction was performed at 40° C.

A modification initiator compound obtained thereby was hydrogenated using an excessive amount of ethanol, and when confirmed with gas chromatography, the dimethylvinylbenzylamine, which was added as a modification functional group-containing compound, was not detected, and it was confirmed that the modification initiator compound was produced at a conversion rate of 99 mol % or higher.

Comparative Example 1

Comparative Example 1 was performed in the same manner as Example 1 except that through the first fluid inlet, a solution in which dimethylvinylbenzylamine was dissolved to 5.7 wt % and a polar additive tetramethylethylenediamine was dissolved to 3.2 wt % together in n-hexane was added at 350 g/hr. At this time, the molar ratio of the n-butyllithium to the dimethylvinylbenzylamine was 1:1.5, and the reaction was performed at 20° C.

A modification initiator compound obtained thereby was hydrogenated using an excessive amount of ethanol, and when confirmed with gas chromatography, the dimethylvinylbenzylamine, which was added as a modification functional group-containing compound, was not detected, and it was confirmed that the modification initiator compound was produced at a conversion rate of 99 mol % or higher.

Meanwhile, 9 hours after the reaction was first started, the outlet of the reactor was clogged, so that the modification initiator production reaction could no longer proceed.

Comparative Example 2

Comparative Example 2 was performed in the same manner as Example 1 except that through the first fluid inlet, a solution in which dimethylvinylbenzylamine was dissolved to 11.3 wt % and a polar additive tetramethylethylenediamine was dissolved to 3.1 wt % together in n-hexane was added at 350 g/hr. At this time, the molar ratio of the n-butyllithium to the dimethylvinylbenzylamine was 1:3, and the reaction was performed at 20° C.

A modification initiator compound obtained thereby was hydrogenated using an excessive amount of ethanol, and when confirmed with gas chromatography, the dimethylvinylbenzylamine, which was added as a modification functional group-containing compound, was not detected, and it was confirmed that the modification initiator compound was produced at a conversion rate of 53 mol % or higher.

Meanwhile, 5 hours after the reaction was first started, the outlet of the reactor was clogged, so that the modification initiator production reaction could no longer proceed.

Comparative Example 3

Comparative Example 3 was performed in the same manner as Example 1 except that in through the first fluid inlet, a solution in which dimethylvinylbenzylamine was dissolved to 11.3 wt %, a polar additive tetramethylethylenediamine was dissolved to 3.1 wt %, and 1,3-butadiene was dissolved to 6.3 wt % all together in n-hexane was added at 350 g/hr. At this time, the molar ratio of the n-butyllithium to the dimethylvinylbenzylamine was 1:3, and the molar ratio of the dimethylvinylbenzylamine to the 1,3-butadiene was 1:0.67. The reaction was performed at 20° C.

A modification initiator compound obtained thereby was hydrogenated using an excessive amount of ethanol, and when confirmed with gas chromatography, the dimethylvinylbenzylamine, which was added as a modification functional group-containing compound, was not detected, and it was confirmed that the modification initiator compound was produced at a conversion rate of 73 mol % or higher.

Comparative Example 4

Comparative Example 4 was performed in the same manner as Example 1 except that in through the first fluid inlet, a solution in which dimethylvinylbenzylamine was dissolved to 11.3 wt %, a polar additive tetramethylethylenediamine was dissolved to 3.1 wt %, and 1,3-butadiene was dissolved to 22.8 wt % all together in n-hexane was added at 350 g/hr. At this time, the molar ratio of the n-butyllithium to the dimethylvinylbenzylamine was 1:3, and the molar ratio of the dimethylvinylbenzylamine to the 1,3-butadiene was 1:6. The reaction was performed at 40° C.

A modification initiator compound obtained thereby was hydrogenated using an excessive amount of ethanol, and when confirmed with gas chromatography, the dimethylvinylbenzylamine, which was added as a modification functional group-containing compound, was not detected, and it was confirmed that the modification initiator compound was produced at a conversion rate of 67 mol % or higher.

Experimental Example 1

In order to confirm the yield and long-term operation possibility of the method for producing a modification initiator according to the present invention, the conversion rate of the modification initiator and the time during which the reactor was clogged in each of Examples 1 to 4 and Comparative Examples 1 to 4 were measured and are shown in Table 1 below. At this time, the time during which the reactor was clogged was the elapsed time from when the reaction started to when the reactor was completely clogged so that the reaction could no longer proceed.

TABLE 1

| Classification | Examples | | | | Comparative Examples | | | |
| --- | --- | --- | --- | --- | --- | --- | --- | --- |
| | 1 | 2 | 3 | 4 | 1 | 2 | 3 | 4 |
| Conversion rate (mol %) | ≥99 | ≥99 | ≥99 | ≥99 | 99 | 53 | 73 | 67 |
| Reactor clogging time (duration hour) | ≥30 | ≥30 | ≥30 | ≥30 | 9 | 5 | 15 | ≥30 |

As shown in Table 1, the method for producing a modification initiator according to the present invention which was applied in Example 1 to Example 4 suppressed the clogging of the reactor, thereby allowing the reaction to be performed for a long period of time compared to Comparative Example 1 and Comparative Example 2. In addition, the method was able to produce the modification initiator with a high conversion rate, and thus, was confirmed to have a very high reaction yield as well. At this time, Comparative Examples 1 and 2 each produced a modification initiator by a production method equivalent to that of Examples except that 1,3-butadiene was not used as a reactant. Comparative Example 1 had a 1:1 level of ratio of the modification functional group-containing compound dimethylvinylbenzylamine and the polymerization initiation functional group-containing compound n-butyllithium, and thus, did not have much of a modification functional group-containing compound, thereby keeping the reaction to continue for a long period of time to produce the modification initiator with a high conversion rate compared to Comparative Example 2 which had a high ratio of a modification functional group-containing compound. However, after a few hours, the reactor was clogged so that the reaction was stopped, and thus the process efficiency, that is, the total available production amount of modification initiator, was significantly degraded compared to Examples in which the reaction was able to be performed for a significantly increased time of three or more times. Meanwhile, Comparative Example 3 and Comparative Example 4 used 1,3-butadiene as a reactant, but Comparative Example 3 used the same below the ratio range proposed by the present invention, so that the content of 1,3-butadiene in the reactant was too small. Therefore, the effect of improving solvent solubility was insignificant so that the generation of excessive oligomers was not suppressed, resulting in a low modification initiator conversion rate, and the effect of suppressing the clogging the reactor was also insignificant. In addition, Comparative Example 4 which used 1,3-butadiene above the ratio range proposed by the present invention had a high ratio of 1,3-butadiene in the reactant, so that a side reaction which forms a butadiene polymer by a polymerization reaction between 1,3-butadiene using n-butyllithium as an initiator occurred, resulting in a significantly degraded modification initiator conversion rate.

Experimental Example 2

Using the modification initiators of Examples 1 to 4 and Comparative Examples 3 and 4, modified conjugated diene-based polymers were prepared, and rubber specimens were prepared therefrom. Thereafter, rolling resistance properties (fuel economy properties) were analyzed, and the results are shown in Table 3 below.

Also, an unmodified conjugated diene-based polymer was prepared for comparison, and a rubber specimen was prepared therefrom. Thereafter, rolling resistance properties (fuel economy properties) were analyzed, and the results are also shown in Table 3 below.

(1) Producing Modified Conjugated Diene-Based Polymer

Into a 20 L autoclave reactor, 3 kg of n-hexane, 270 g of styrene, 710 g of 1,3-butadiene, 4.7 mmol of the modification initiator prepared in each of Examples, and 1.29 g of 2,2-bis(2-oxolanyl)propane as a polar additive were added. Thereafter, the temperature inside the reactor was set to 60° C., and then an adiabatic heating reaction was performed. About 30 minutes later, 20 g of 1,3-butadiene was added to cap an end of a polymer with butadiene and a reaction was performed for 10 minutes. Thereafter, the reaction was stopped using ethanol, and 33 g of a solution in which an antioxidant Wingstay K was dissolved to 30 wt % in hexane was added. A polymer obtained thereby was put in hot water heated with steam and then stirred to remove a solvent, following by performing roll-drying to remove residual solvent and water, thereby producing each modified styrene-butadiene copolymer.

(2) Comparative Example 5: Producing Unmodified Conjugated Diene-Based Polymer

Into a 20 L autoclave reactor, 3 kg of n-hexane, 270 g of styrene, 710 g of 1,3-butadiene, 4.7 mmol of n-butyllithium, and 1.29 g of 2,2-bis(2-oxolanyl)propane as a polar additive were added. Thereafter, the temperature inside the reactor was set to 60° C., and then an adiabatic heating reaction was performed. About 30 minutes later, 20 g of 1,3-butadiene was added to cap an end of a polymer with butadiene and a reaction was performed for 10 minutes. Thereafter, the reaction was stopped using ethanol, and 33 g of a solution in which an antioxidant Wingstay K was dissolved to 30 wt % in hexane was added. A polymer obtained thereby was put in hot water heated with steam and then stirred to remove a solvent, following by performing roll-drying to remove residual solvent and water, thereby producing an unmodified styrene-butadiene copolymer.

(3) Preparing Rubber Specimen

Each of the modified or unmodified styrene-butadiene copolymers prepared above was used as raw rubber and blended under the blending conditions shown in Table 2 below. The content of raw materials in Table 2 is the part by weight of each raw material based on 100 parts by weight of the raw rubber.

TABLE 2

| Classification | Raw material | Content (part by weight) |
| --- | --- | --- |
| First stage kneading | Rubber | 100 |
| | Silica | 70 |
| | Coupling agent (X50S) | 11.2 |
| | Process oil | 37.5 |
| | Zinc white | 3 |
| | Stearic acid | 2 |
| | Antioxidant | 2 |
| | Anti-aging agent | 2 |
| | Wax | 1 |
| Second stage kneading | Sulfur | 1.5 |
| | Rubber accelerator | 1.75 |
| | Vulcanization accelerator | 2 |

Specifically, a rubber specimen is kneaded through a first stage kneading and a second stage kneading. In the first stage kneading, using a banbury mixer having a temperature control device, the raw rubber, silica (a filler), an organosilane coupling agent (X50S, Evonik), process oil (TDAE oil), a zinc white (ZnO), a stearic acid, an antioxidant (TMQ (RD)) (2,2,4-trimethyl-1,2-dihydroquinoline polymer), an anti-aging agent (6PPD ((dimethylbutyl)-N-phenyl-phenylenediamine)) and a wax (Microcrystaline Wax) were kneaded. At this time, the initial temperature of a kneader was controlled to 70° C., and after the completion of the blending, a primary blend was obtained at a discharge temperature of 145° C. to 155° C. In the second stage kneading, the primary blend was cooled to room temperature, and then the primary blend, sulfur, a rubber accelerator (DPG (diphenylguanidine)), and a vulcanization accelerator (CZ (N-cyclohexyl-2-benzothiazylsulfenamide)) were added to the kneader, and then mixed at a temperature of 100° C. or lower to obtain a secondary blend. Thereafter, a curing process was performed at 160° C. for 20 minutes to prepare a rubber specimen.

(4) Rolling Resistance Properties

Rolling resistance properties (fuel economy properties) were confirmed with a tan δ value by measuring viscoelastic behavior for dynamic deformation at a frequency of 10 Hz and at each measurement temperature (−60° C. to 60° C.) in Film Tension mode using a dynamic mechanical analyzer (GABO Co., Ltd.). In the measurement results, the lower the tan δ value at 60° C., the lower the hysteresis loss and the better the rotational resistance properties (fuel efficiency properties). However, in Table 3 below, the result values are shown by indexing based on the measurement value of Comparative Example 5. The larger the value, the better the rotation resistance properties are.

TABLE 3

| Classification | Examples | | | | Comparative Examples | | |
|---|---|---|---|---|---|---|---|
| | 1 | 2 | 3 | 4 | 3 | 4 | 5 |
| tan δ (at 60° C.) | 112 | 123 | 131 | 121 | 110 | 112 | 100 |

In Table 3 above, values for Examples 1 to 4, Comparative Examples 3 and 4 are shown by indexing based on the measurement value of Comparative Example 5. The larger the value, the better it is. As confirmed through Table 3 above, a polymer prepared using a modification initiator produced by the production method according to an embodiment of the present invention showed remarkably improved rolling resistance properties compared to Comparative Example 5 which is unmodified.

In addition, Example 2, Example 4, Comparative Example 3 and Comparative Example 4 to which a modification initiator produced using the same ratio of a modification functional group-containing compound and a polymerization initiation functional group-containing compound was applied were confirmed to be able to remarkably improve rolling resistance properties of a rubber composition substance by more than 10% compared to Comparative Examples 3 and 4. At this time, Comparative Examples 3 and 4 had different ratios of 1,3-butadiene used when producing a modification initiator, but had the same level of other conditions as Examples 2 and 4.

Through the above, it can be confirmed that a modification initiator prepared by the preparation method according to the present invention may be used in the polymerization of a polymer to introduce a functional group into the polymer as soon as the polymerization is initiated, thereby easily modifying the polymer.

The invention claimed is:

1. A method for preparing a modification initiator, the method comprising:
    step S1: reacting a first fluid including a modification functional group-containing compound and a conjugated diene-based monomer and a second fluid including a polymerization initiation functional group-containing compound; and
    step S2: obtaining a third fluid including a modification initiator prepared by the reaction of step S1,
    wherein:
    the modification functional group-containing compound is used in a ratio of greater than 1 mole based on 1 mole of the polymerization initiation functional group-containing compound;
    the conjugated diene-based monomer is used in a ratio of 1 mole to 4 moles based on 1 mole of the modification functional group-containing compound;
    step S1 and step S2 are continuously performed; and
    the first fluid further comprises a polar additive, and the first fluid is prepared by sequentially and continuously mixing the modification functional group-containing compound, the conjugated diene-based monomer, and the polar additive.

2. The method of claim 1, wherein the modification functional group-containing compound is used in a ratio of 1.5 moles to 10.0 moles based on 1 mole of the polymerization initiation functional group-containing compound.

3. The method of claim 1, wherein the modification functional group-containing compound is used in a ratio of 3.0 moles to 5.0 moles based on 1 mole of the polymerization initiation functional group-containing compound.

4. The method of claim 1, wherein at least one of the first fluid or the second fluid further comprises a polar additive.

5. The method of claim 1, wherein the reaction of step S1 is performed at −50° C. to 50° C.

6. The method of claim 1, wherein step S1 is performed by adding, into a reactor provided with a first fluid inlet and a second fluid inlet, the first fluid through the first fluid inlet and the second fluid through the second fluid inlet, and mixing the first fluid and the second fluid,
    wherein at the time of the mixing, the flow rate of the first fluid and the flow rate of the second fluid are maintained constant, and the flow velocity of the first fluid is increased.

7. The method of claim 6, wherein when adding the first fluid and the second fluid, each of the first fluid and the second fluid has a laminar flow.

8. The method of claim 6, wherein when adding the first fluid and the second fluid, the flow direction of the first fluid and the flow direction of the second fluid are perpendicular to each other.

9. The method of claim 1, wherein the modification functional group-containing compound is a compound represented by Formulas 1 or 2 below:

[Formula 1]

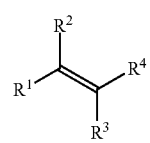

wherein $R^1$ to $R^4$ are each independently a C1-C30 monovalent hydrocarbon group, a C1-C30 heteroalkyl group containing one or more of N, O, or S, or a C4-C30 heterocyclic group containing one or more of N, O, or S,

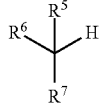

[Formula 2]

wherein $R^5$ to $R^7$ are each independently a C1-C30 monovalent hydrocarbon group, a C1-C30 heteroalkyl group containing one or more of N, O, or S, or a C4-C30 heterocyclic group containing one or more of N, O, or S, and $R^5$ and $R^6$, $R^6$ and $R^7$, or $R^5$ and $R^7$ are optionally bonded to each other, and together with the carbon atom to which they are attached to form a C5-C30 hydrocarbon ring group including —$CR^8R^9$, —$NR^{10}$—, —O—, or —S—, wherein $R^8$, $R^9$, and $R^{10}$ are each independently hydrogen, a C1-C30 monovalent hydrocarbon group, a C1-C30 heteroalkyl group containing one or more of N, O, or S, or a C4-C30 heterocyclic group containing one or more of N, O, or S.

10. The method of claim 1, wherein the polymerization initiation functional group-containing compound is a compound represented by Formula 3 below:

[Formula 3]

wherein $R^{11}$ is a C1-C30 monovalent hydrocarbon group, and M is an alkali metal.

11. The method of claim 6, wherein the flow velocity of the first fluid is increased as the first fluid flows through a deformation part provided in the reactor.

* * * * *